June 18, 1946.  I. I. SIKORSKY  2,402,349
ADJUSTABLE ROTOR
Filed Feb. 27, 1943   3 Sheets-Sheet 1
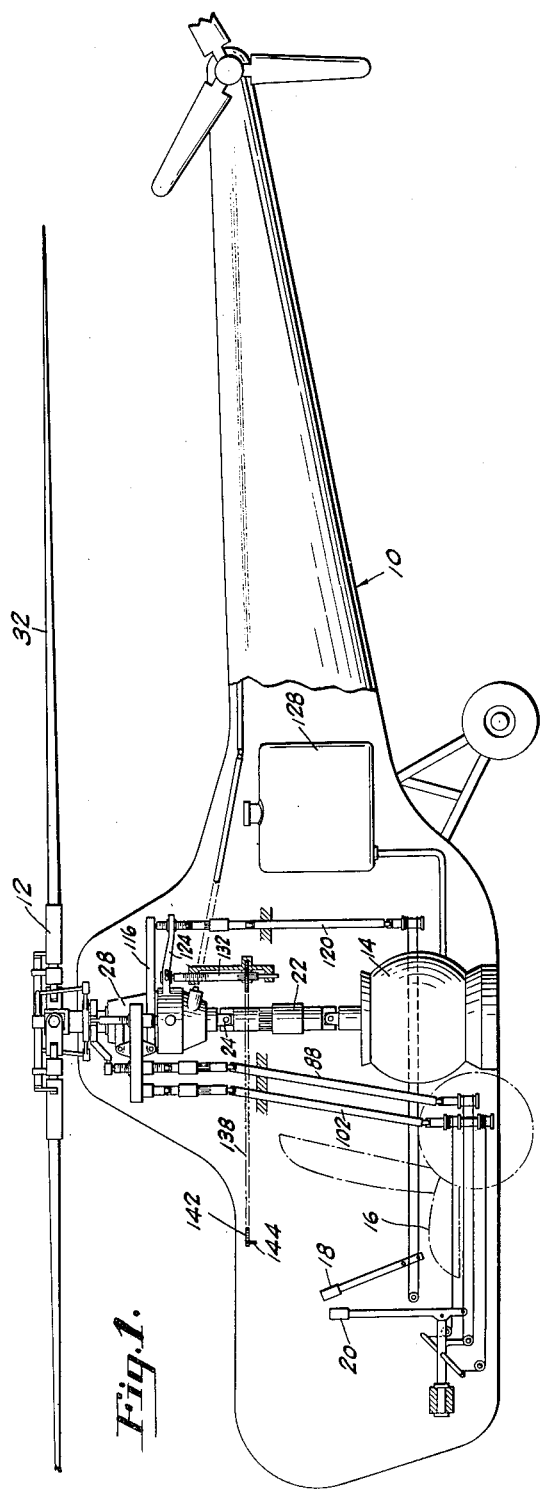
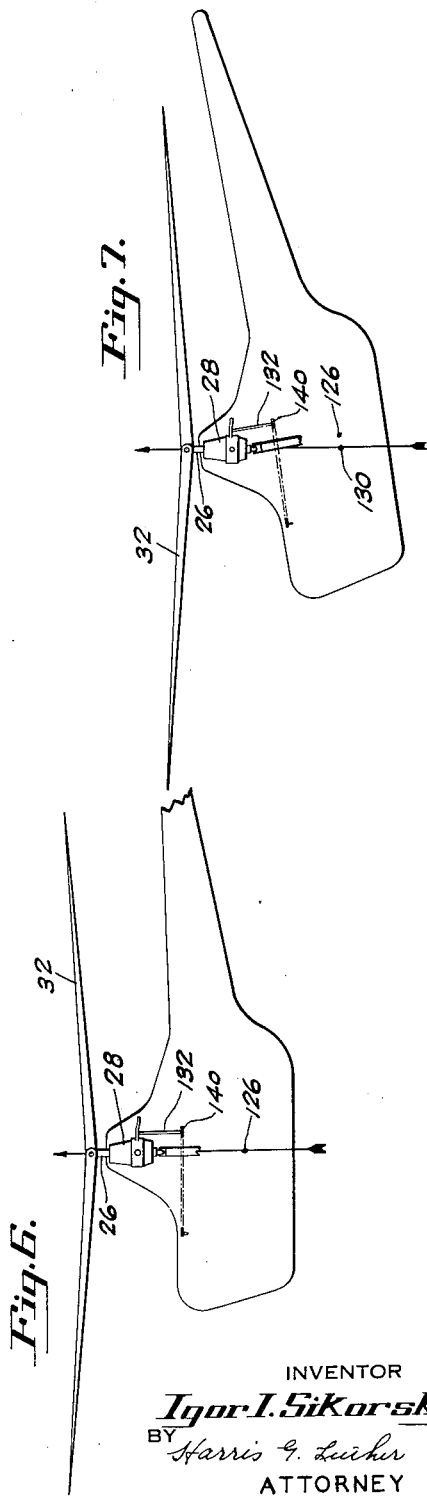
INVENTOR
Igor I. Sikorsky
BY Harris G. Luther
ATTORNEY June 18, 1946.  I. I. SIKORSKY  2,402,349
ADJUSTABLE ROTOR
Filed Feb. 27, 1943  3 Sheets-Sheet 2
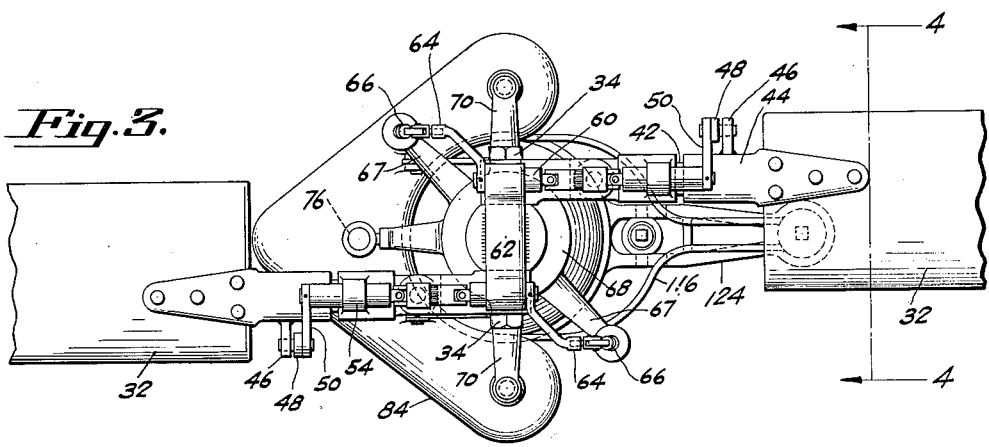
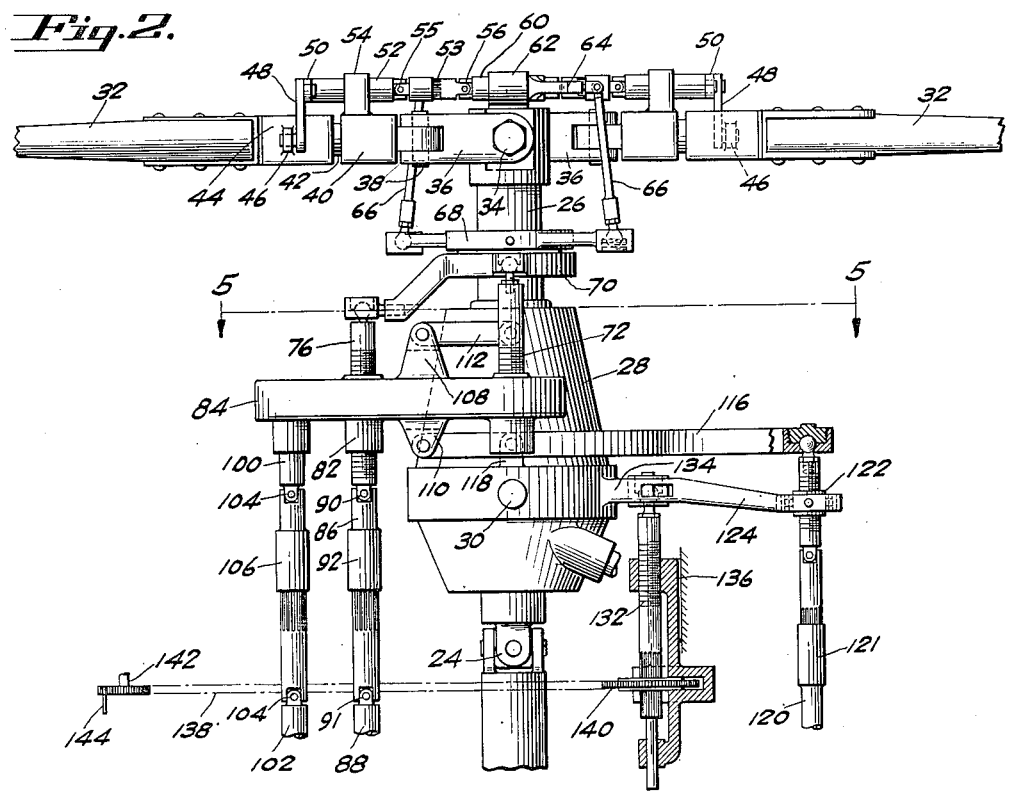
INVENTOR
Igor I. Sikorsky.
BY Harris G. Luther
ATTORNEY June 18, 1946.   I. I. SIKORSKY   2,402,349
ADJUSTABLE ROTOR
Filed Feb. 27, 1943   3 Sheets-Sheet 3
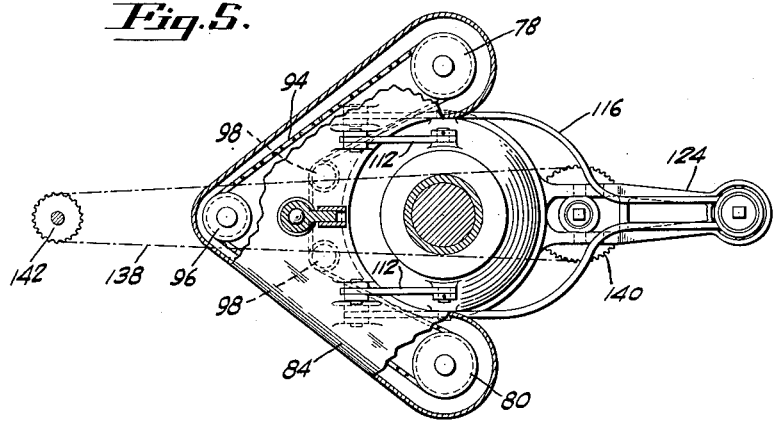
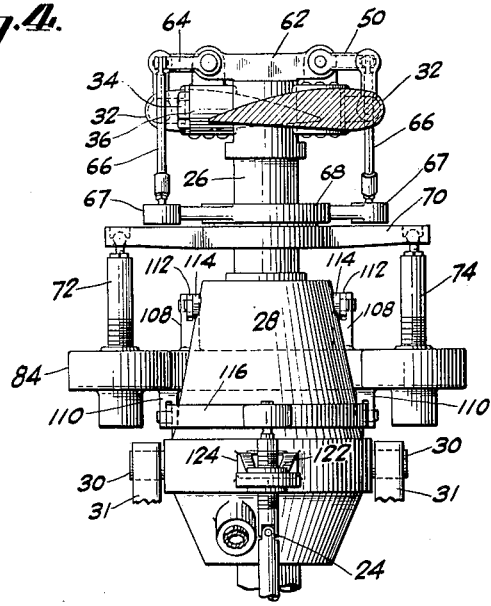
INVENTOR
Igor I. Sikorsky.
BY Harris G. Luther
ATTORNEY Patented June 18, 1946

2,402,349

UNITED STATES PATENT OFFICE 2,402,349

ADJUSTABLE ROTOR

Igor I. Sikorsky, Bridgeport, Conn., assignor to United Aircraft Corporation, East Hartford, Conn., a corporation of Delaware Application February 27, 1943, Serial No. 477,416

4 Claims. (Cl. 244—17)

This invention relates to improvements in helicopters and particularly to improvements in an adjustable rotor for a helicopter.

Under normal stable conditions, such as hovering, the rotating blades of a hinged bladed rotor of a helicopter describes a cone whose axis (extended) passes substantially through the center of gravity of the supported structure. Lateral movement of the helicopter in any direction is obtained by tilting the axis of the cone in the direction in which the movement is desired. The tilting of this cone is accomplished by a cyclical or progressive variation in the rotor blade pitch. If the center of gravity of the supported structure does not fall substantially on the axis of the rotor driving shaft the axis of the cone described by the rotating rotor blades may be caused to pass through this center of gravity by tilting that cone by the use of the cyclical pitch control. Such use of the cyclical pitch control, however, reduces its range of usefulness in imparting lateral motion to the helicopter and requires constant force by the operator.

An object of this invention is to provide structure, independent of the cyclical pitch control, for compensating for changes in the location of the center of gravity of the helicopter in flight or at the ground.

A feature of this invention is a rotor carrying head mounted for tilting in a fore-and-aft direction about a horizontal axis with respect to the remainder of the structure so that the axis of the cone described by the rotating rotor blades may be tilted without the use of the cyclical pitch control and without affecting a predetermined selection of the position of the same.

Another object is to provide an improved pitch changing mechanism.

Other objects and advantages will be apparent from the specification and claims and from the accompanying drawings which illustrate what is now considered to be a preferred embodiment of the invention.

Fig. 1 is a side elevation of the helicopter with parts broken away.

Fig. 2 is a side elevation on a larger scale of the rotor carrying head and the controls.

Fig. 3 is a plan view of the structure of Fig. 2.

Fig. 4 is a rear elevation of the structure of Fig. 2.

Fig. 5 is a sectional view substantially along the line 5—5 of Fig. 2.

Fig. 6 is a diagrammatic showing of the normal position of the helicopter and the rotor-carrying head.

Fig. 7 is an exaggerated view of the change in the position of the head when the center of gravity of the helicopter is shifted.

The helicopter has a sustaining rotor 12 driven by an engine 14 mounted in the fuselage 10. The pilot occupies a seat 16 and controls the helicopter by several controls including levers 18, 20. The lever 18 changes the pitch of all of the blades simultaneously, and the lever 20 adjusts the cyclical pitch-changing mechanism by which the pitch of each blade is progressively changed during each revolution. This lever 20 also controls the point in each revolution at which the progressive change is initiated.

The engine 14 drives a shaft 22 connected by a splined joint and two universal joints one of which is indicated at 24 in Figs. 1 and 2, to the rotor-carrying shaft 26 journaled in the head 28 which may house a reduction gear. Head 28 has laterally projecting trunnions 30, Fig. 4, supported in bearings in a bracket 31, (Fig. 4) fixed within the helicopter. Mechanism described below is provided to rock the head 28 on trunnions 30 for a purpose also described below.

The rotor blades are pivotally mounted on the upper end of shaft 26 for pitch changing and coning movements and also for movement in the direction of rotation. For this purpose the individual blades 32 of rotor 12 are pivotally mounted on horizontal pins 34 in links 36. The outer end of link 36 carries a vertical pin 38 pivotally supporting a connector 40 which in turn carries a pin or projection 42 which fits within a bracket 44 attached to the inner end of the blade 32. Blade 32 is thus turnable about the axis of pin 42 for adjusting the pitch of the blade, and the coning angle and flapping of the blade may vary by oscillation of the blade structure about the axis of pin 34 and differences in drag may be accommodated by movement in the direction of rotation about the pin 38.

The rotor blade pitch adjusting mechanism comprises a plate 68 mounted on gimbals to rotate with the shaft 26 and also movable axially thereon. This plate is connected, at one side, by links and levers, described in detail hereinafter, with the rotor blades for changing their pitch. This plate is connected at the other side by a swivel connection with a plate 70 supported by three adjustable jacks 72, 74 and 76 for axial or angular movements with respect to the shaft 26. Axial movement of the support rod 76 or differential movement of the rods 72 and 74 will cause tipping of the plate 70 and its associated plate 68 to thereby cause cyclical changes in the propeller pitch. The upper ends of these jacks are connected to the plate by flexible couplings. These jacks engage respectively with threaded sleeves 78, 80 (Fig. 5) and 82 (Fig. 2) fixed within a supporting housing 84 against axial movement relative to said jacks but sleeves 78 and 80 are turnable within said housing for raising or lowering the jacks 74 and 72 respectively, while jack 76 is rotated in sleeve 82 for raising and lowering it.

Adjustment of jack 76 for controlling the forward motion of the helicopter is effected through a shaft 86 connected to the lower end of the jack through a universal joint 90 and driven from a shaft 88 through universal joint 91 and a splined connection 92. Shaft 88 is turned by forward or rearward movement of control lever 20 through conventional connections.

Sleeves 78 and 80 are differentially turned for controlling the lateral motion of the helicopter by means of a chain 94 connecting sleeves 78 and 80 to a drive sleeve 96. All of these sleeves carry conventional sprocket teeth not shown. Idling pulleys 98 guide the chain within the housing. Sleeve 96 has an integral shaft 100 connected to a driving shaft 102 through universal joints 104 and a splined connection 106. Shaft 102 is turned by a sidewise motion of the control lever 20 through conventional connections.

The links and levers connecting the plate 68 with the rotor blades for changing their pitch comprise a laterally projecting arm 46 on bracket 44 and connected by a link 48 to an arm 50. This arm 50 is mounted on the end of a shaft 52 journaled in a lug 54 on connector 40. Shaft 52 is connected by universal joints 55 and 56 and a splined connection 53 to a shaft 60 journaled in a block 62 fixed to the end of rotor shaft 26. The end of shaft 60 has a projecting arm 64 connected by a link 66 to an arm 67 integral with a control plate 68.

Housing 84 supporting the control jacks is supported on head 28 so that the head and housing move as a unit. As shown, the housing has spaced lugs 108 projecting from its upper surface and corresponding lugs 110 on the under surface. Lugs 108 are connected by links 112 (Fig. 2), to brackets 114 (Fig. 4) on the head. Lugs 110 are connected by links 116 to brackets 118 in the head, and these links 116 extend rearwardly beyond the head to be connected to a vertical control rod 120. A part of rod 120 is threaded to fit within a sleeve 122 in an extension 124 on the head. Turning of rod 120, which is possible by reason of swivel connection between the rod and the links 116, raises or lowers housing 84 as a unit thus bodily simultaneously moving the three points of support of the plates 70 and 68, thus moving the plate 68 axially and adjusting the normal pitch of all of the rotor blades simultaneously.

Links 112 and 116 form a parallel linkage motion so that the plane of housing 84 is always in the same predetermined angular relation to the axis of head 28 regardless of the vertical position of said housing. Rod 120 is turned by forward or rearward motion of control lever 18 through conventional connections.

While the center of gravity of the helicopter remains in the position indicated by the reference numeral 126, Fig. 6, so that it is directly below the rotor and in line with the axis of shaft 26, the head 28 is retained in the position shown in this figure. If, for any reason, such as a decrease in the quantity of fuel in tank 128, Fig. 1, the center of gravity of the helicopter is displaced to point 130, Fig. 7 (this motion of the center of gravity being greatly exaggerated), head 28 may be rocked about the axis of trunnions 30 so that rotor shaft 26 will again be aligned with the new center of gravity, and the rotor will be directly over the new center of gravity.

Head 28 is tilted on its trunnions 30 by means of a jack 132 (Figs. 1 and 2), the upper end of which is connected, by a swivel joint, to a projecting lug 134 on the head. Jack 132 engages a threaded sleeve 136 fixed with respect to the helicopter fuselage so that turning of the jack will tilt the head angularly about the horizontal axis of the trunnions. The jack may be turned through a chain drive including a chain 138, a sprocket 140 on the lower end of the jack, and a sprocket 142 supported in the helicopter at a convenient point. Sprocket 142 may have a crank handle 144 by which it is turned.

It will thus be seen that raising and lowering of jack 132 will pivot the entire rotor head on trunnions 30 in a fore-and-aft plane in relation to the helicopter and its forward line of flight to accomplish a relief on control stick 20 and trim the aircraft for changes in the center of gravity caused by the change in the location of the useful load or for other reasons that may obviate the necessity of changing the relative position for a prolonged period in a fore-and-aft stability of the aircraft. In changing the position of tilt of the rotor head, it is quite necessary that the control operating the pitch or angle of attack of the rotor blades remain at the predetermined setting and that these controls may be operated at will independent of the operation of this trimming device.

When head 28 is tilted angularly about its horizontal axis, the housing 84 will move with the head so that the obliquity of plate 70 with respect to the axis of shaft 26 is entirely unaffected. The splined connections 92, 106, and 121, together with the various universal joints, permit such movement while retaining the fixed position of the various controls. Thus the movement of the head compensates for a change in the center of gravity without in any way affecting the controls for the rotor blades. By adjustment of the head so that the center of gravity is always in line with the axis of shaft 26, the pilot is relieved of the necessity for any adjustment of other controls to compensate for the changes in the center of gravity.

It is to be understood that the invention is not limited to the specific embodiment herein illustrated and described, but may be used in other ways without departure from its spirit as defined by the following claims.

What I claim is:

1. In an aircraft, a fuselage, a sustaining rotor above the fuselage, blades on the rotor, means mounting the blades for pitch changing movement, a shaft supporting said rotor, a head in which said shaft is journaled mounted in said fuselage, an adjustably mounted plate on said shaft having pitch control connections with said blades, a housing mounted on the head and having means for changing the position of the plate bodily with respect to the shaft for adjusting the pitch of the blades both collectively and cyclically, and means for adjusting the angularity of the head and housing with respect to the fuselage without changing the position of said plate with respect to the shaft including support means between said housing and said adjustable means.

2. In an aircraft, a fuselage, a sustaining rotor above the fuselage, blades on the rotor, means mounting the blades for pitch changing movement, a shaft supporting said rotor, a head in which said shaft is journaled mounted in said fuselage, an adjustably mounted control means on said shaft having pitch control connections with said blades, a housing mounted on the head and having means for changing the position of the control means bodily with respect to the shaft for adjusting the pitch of the blades both collectively and cyclically, and means for adjusting the position of the head and housing with respect to the fuselage without changing the position of said control means with respect to the shaft including support means between said housing and said adjustable means.

3. In combination, a helicopter having a fuselage, a rotor, a drive shaft therefor, a shaft support pivotally mounted on the upper part of the fuselage for fore-and-aft pivotal movement, said rotor having a plurality of universally mounted blades substantially free to oscillate in two directions and controlled in a third direction to control the angle of inclination of the rotor, a movable plate adjacent said shaft and having one portion rotatable with said rotor and one portion held against rotation, means connecting each of the blades with said rotatable plate portion to control the pitch of said blades, control rods connected at spaced points with said fixed plate portion, means carried by said shaft support for simultaneously changing the pitch of all the blades, means acting through said means carried by said shaft support for individually changing the effective length of said rods, and means for adjusting said shaft support with respect to said fuselage including means for maintaining the adjusted relationship of said plate.

4. In an aircraft, a fuselage, a sustaining rotor above the fuselage, blades on the rotor, means mounting the blades for pitch changing movement, a shaft supporting said rotor, a head in which said shaft is journaled mounted in said fuselage, an adjustably mounted plate on said shaft having pitch control connections with said blades, a housing mounted on the head and having means for changing the obliquity of the plate with respect to the shaft for adjusting the pitch of the blades, and means for adjusting the angularity of the head and housing with respect to the fuselage without affecting the obliquity of said plate with respect to the shaft including support means between said housing and said adjustable means.

IGOR I. SIKORSKY.